United States Patent [19]
Hewko

[11] Patent Number: 5,497,968
[45] Date of Patent: Mar. 12, 1996

[54] EMERGENCY RESPONSE EQUIPMENT SECURING SYSTEM AND ACCESSORIES

[75] Inventor: Barry J. Hewko, Sidney, Canada

[73] Assignee: Vancouver Island Helicopters Ltd., Sidney, Canada

[21] Appl. No.: 318,071

[22] Filed: Oct. 5, 1994

[51] Int. Cl.$^6$ ..................................... A47B 96/06
[52] U.S. Cl. ............................. 248/214; 296/19
[58] Field of Search ................... 248/214, 231.4, 248/298; 296/19, 20; 5/658; 244/118.6

[56] References Cited

U.S. PATENT DOCUMENTS

| | | | |
|---|---|---|---|
| 2,711,300 | 6/1955 | Nelson | 248/214 |
| 3,784,140 | 1/1974 | Auerbach | 248/214 |
| 3,840,265 | 10/1974 | Stirling | 296/19 |
| 4,093,303 | 6/1978 | Nelson . | |
| 4,273,374 | 6/1981 | Portman | 5/658 |
| 4,339,146 | 7/1982 | Lehmann | 244/118.6 X |
| 4,783,025 | 10/1988 | Moffett . | |
| 4,783,109 | 10/1988 | Bucalo . | |
| 4,925,211 | 5/1990 | Whittaker | 296/19 X |
| 5,275,170 | 1/1994 | Lewis | 5/658 X |
| 5,383,629 | 1/1995 | Morgan | 296/19 X |

FOREIGN PATENT DOCUMENTS

| | | | |
|---|---|---|---|
| 1160138 | 12/1963 | Germany | 296/19 |
| 1289443 | 2/1969 | Germany | 296/19 |

*Primary Examiner*—J. Franklin Foss
*Attorney, Agent, or Firm*—Graybeal Jackson Haley & Johnson

[57] ABSTRACT

A method and apparatus are provided for securing medical equipment within an interior of an emergency vehicle, the apparatus including an elongated suspension bar (23) positioned within the emergency vehicle relative to a substantially planar surface (27) (25), and an equipment fastener (53) (110) for attaching thereto medical equipment (51). The equipment fastener (53) (110) for securing the medical equipment (51) to the elongated suspension bar (23) is preferably slidable along the longitudinal length of the elongated suspension bar (23). The equipment fastener (53) (110) includes a base block (77) (116) and a slider pinch block (79) (127), wherein the slider pinch block (79) (127) can be moved toward and away from the base block (77) (116) thereby releasing and securing the equipment fastener (53) (110) to the elongated suspension bar (23). Further aspect of the present invention include a stretcher bridge (500) for being secured to a stretcher (21), the stretcher bridge (500) for receiving medical equipment and accessories (51), and the equipment fastener (53) (110). Using the present invention equipment may be released from the elongated suspension bar (23), secured to the stretcher bridge (500) and carried to the patient's side or along with the patient into a medical facility.

19 Claims, 8 Drawing Sheets

EMERGENCY RESPONSE EQUIPMENT SECURING SYSTEM AND ACCESSORIES

FIELD OF THE INVENTION

The present invention relates generally to accessories for adjustably and removably mounting medical equipment within emergency response vehicles, specifically air-medical helicopters, the accessories being adapted for quick, convenient and safe transfer of the medical equipment by the medical attendants to the patient's side and with the patient between emergency vehicles and medical facilities.

BACKGROUND OF THE INVENTION

The medical profession has long recognized that the outcome of an emergency involving a serious injury or illness is very dependent on the patient receiving proper medical attention as expeditiously and as efficiently as possible, both immediately after an accident (or unexpected illness) and during transportation of the patient to a permanent medical facility. Similarly, quick and proper care reduces the overall cost of a serious injury or illness.

In this regard, emergency vehicles, including air-medical aircraft, are generally operated by highly trained medical personnel, and include a variety of medical equipment and supplies carried on board the emergency vehicle for use in an emergency situation. While it is vitally important to have knowledgeable medical personnel at the patient's side as quickly as possible after the injury (or illness), many emergency situations also require special medical equipment to properly care for the needs of the patient at the scene of the accident, and during transportation of the patient to a medical facility.

Advancements in emergency medical equipment technology have reduced both the size and the weight of emergency equipment. Where older counterparts of newer generation equipment may not have been economically transported to the patient's side because the equipment was too large and/or too heavy to be economically configured to emergency vehicle, the newer smaller/lighter versions are more easily adapted to emergency vehicles and carried to the accident site for emergency use. In this regard, using newer generation emergency equipment, more life saving equipment can be carried on board the emergency vehicle to the accident site for emergency use; this reduces the time a seriously injured patient must wait before receiving proper medical attention.

While much of the emergency equipment carried on board the emergency vehicle may not be used for each and every emergency, if the equipment is compact and light weight enough to be readily stored or positioned within the vehicle interior—so as to not inhibit use of other equipment by the attendants, or significantly reduce the efficiency of the emergency vehicle by adding excess weight—equipment that is used less frequently can be kept on board the emergency vehicle at all times. Thus, as breakthroughs in equipment technology continually reduce the size and weight of medical equipment, more and more life saving medical equipment can be carried directly to the patient's side (i.e., the accident site) as opposed to bringing the patient to the equipment (i.e., the hospital emergency room). Examples of equipment currently carried on board emergency vehicles include monitors, defibrillators, oxygen tanks, intravenous bags and intravenous pumps, to mention a few.

However, as more equipment is carried on board the emergency vehicle, positioning of the equipment within the emergency vehicle interior becomes more critical to ensure the accessibility of the attendant (and/or attendants) to the equipment, supplies and the patient (and/or patients). Attendants must be able to readily access the emergency equipment in a safe and efficient manner when needed, and readily move the equipment within the vehicle interior to storage positions when not needed, or within close proximity of the patient when needed; this is particularly applicable to air-medical aircraft. Equipment that is difficult or cumbersome to access and use by medical attendants will, when time is of the essence, not be used. This can reduce the overall efficiency of the medical attendants and of the emergency response vehicle, hence the final care received by the patient.

In the air-medical industry, weight is an even more important factor when designing aircraft interiors (this is opposed to ground ambulances). Specifically, the medical equipment, accessories, and components comprising the aircraft interior must be small and lightweight without unnecessarily sacrificing strength and durability. In addition, aircraft interiors are generally compact and require that the equipment, for safety reasons, be permanently positioned within the aircraft cabin prior to flight (this is a requirement of the aviation administrations in the U.S. and in Canada). More specifically, during flight the equipment must be securely mounted within the aircraft interior to prevent the equipment from being hurled about the aircraft interior in rough or windy conditions, or in the event of an emergency (or rough) landing. Equipment and equipment mounting hardware that is not properly secured within the aircraft interior, or which requires the attendant to detach the equipment for relocation during flight, can inadvertently strike passengers—pilots, attendants and patient(s)—if, for example, turbulence is encountered during flight while the equipment is being relocated. Also, because aircraft cannot be readily landed or stopped (as opposed to ground ambulances) to retrieve needed equipment that may be stored in external storage compartments, it is even more important that the equipment adapted for air-medical use be carried within the aircraft interior wherein the medical attendants can easily move the equipment about the aircraft interior without unnecessarily detaching the equipment from its mounting hardware. Additionally, since weight and balance are particularly important to safe aircraft operations, mounting hardware used to securely attach medical equipment within the aircraft interior should be lightweight and compact to avoid significantly changing the aircraft center of gravity as the equipment and mounting hardware are moved about the aircraft interior.

Emergency vehicle interior space that is not well planned with respect to emergency equipment location, patient location and attendant accessibility to both the equipment and the patient, can be a detriment to effectively treating the patient or patients. In an extreme case, poorly configured emergency vehicle interiors may result in the loss of a patient because of inaccessibility to needed emergency equipment, or the inability of the attendant to properly monitor the equipment and simultaneously tend to the patient's needs. Accordingly, medical equipment should be conveniently located within the emergency vehicle interior and be readily accessible by the attendant or attendants. Further, emergency equipment should be readily movable within the vehicle interior and with the patient as the patient is transferred between emergency vehicles and/or between emergency vehicles and medical facilities.

Time, space and manpower are the principal constraints in emergency care response. Since only one or two medical attendants are typically available to serve the patient's needs during the entire transfer and transportation process, these attendants must have efficient and effective access to the medical equipment necessary to treat the patient's medical needs. In this regard, there is a need for a system of adapting medical equipment within the interior of an emergency response vehicle, specifically an air-medical helicopter, that economically utilizes available space within the aircraft interior allowing the attendants to readily move and/or relocate the medical equipment with respect to the patient without necessarily removing the equipment from its securing rack. In addition, the system should allow the attendants to readily remove the equipment from the aircraft interior when it is more convenient to carry the equipment to the patient's side and/or to transport the equipment with the patient on a respective stretcher.

SUMMARY OF THE INVENTION

The present invention provides a system and apparatus for readily securing and relocating medical equipment within an emergency vehicle interior. In addition, the system provides for easily removing the emergency medical equipment from the emergency vehicle interior when it is more convenient to transport the equipment to the patient's side, or to transport the equipment with the patient into a medical facility. In the preferred embodiment of the present invention, the system is adapted for aircraft use, particularly air-medical helicopters. The preferred emergency helicopter interior for the present invention accommodates two patients, provides seating for at least two attendants to treat the needs of the patients, and allows for two pilots.

In the preferred embodiment of the present invention, an elongated suspension bar is attached to a substantially planar surface within the interior of the emergency response vehicle, preferably to the roof or ceiling of the emergency vehicle interior. The elongated suspension bar is generally adjustable laterally and longitudinally with respect the emergency vehicle interior, is circular in cross section and provides a rigid mounting structure for attaching thereto medical equipment and accessories, and medical equipment mounting hardware. The elongated suspension bar may be positioned either laterally or longitudinally with respect to the longitudinal axis of the emergency response vehicle.

Configured to be movably and removably attached to the elongated suspension bar for securing the medical equipment within the aircraft interior, the present invention provides a hardware clamping system (or equipment fastener) capable of being configured to support various types of medical equipment and accessories. More specifically, in the preferred embodiment of the present invention, the hardware clamping system includes a base block having an inner curved surface semicircular wherein an adjustable slider pinch block can be adjusted toward and away from the inner curved surface of the rigid base block such that the elongated suspension bar can be clamped between the inner curved surface of the base backing block and the slider pinch block. The rigid base block and the slider pinch block are preferably adaptable to various medical equipment mounting plates, bars and other mounting apparatus specifically configured to accept a variety of medical equipment. The clamping hardware system generally includes an upper end and a lower end, the upper end being movably attachable to the elongated suspension bar, and the lower end providing a support for attaching thereto medical equipment to be secured in the interior of the emergency response vehicle.

The present invention further includes a slidable collar having suspension hooks (or mounts) secured thereto. The collar is preferably longitudinally adjustable along the length of the elongated suspension bar. The suspension hooks generally include at least one hook (permanently or rotatably) secured to the collar. The collar generally includes a locking means for preventing movement of the collar with respect to the elongated suspension bar when the lock means is in the locked configuration, or allowing movement of the collar along the elongated suspension bar when the locking means is released.

During transfer and transportation of injured and/or ailing patients to an appropriate medical facility (or between medical facilities) by an emergency medical vehicle (i.e., an ambulance, a helicopter or an airplane) the patient is usually carried on a stretcher. In the preferred embodiment of the present invention, the system includes a stretcher bridge wherein the hardware clamping system provides for removing the medical equipment from the suspension bar, to be readily attached to the stretcher bridge, the stretcher bridge being secured to the stretcher, preferably over the foot end of the stretcher. Accordingly, the medical equipment can be carried on the stretcher with patient from the accident site to the emergency vehicle and into the medical facility as is deemed necessary by the medical attendant.

In one aspect of the present invention, the system provides for securing and repositioning medical equipment relative to the emergency vehicle interior. In this embodiment, the medical equipment is relocated and secured along the length of the elongated suspension bar. In another aspect of the present invention, medical equipment, using the same clamping hardware system, can be securely positioned on the stretcher bridge attached to the stretcher. In this embodiment, the medical equipment and accessories can be transported to the patient and with the patient on the stretcher.

BRIEF DESCRIPTION OF THE DRAWINGS

The advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

For purposes of describing the preferred embodiment of the present invention, the description of the embodiments will be limited to an air-medical aircraft interior, specifically the interior of an air-medical helicopter, used to transport seriously injured (or ailing) patients. The helicopter interior used to describe the present invention is preferably adapted to both on-scene work, (i.e., the aircraft picks the patient up directly from the scene of an accident) and inter-hospital transfers (i.e., the patient is transferred from one medical facility to another). The preferred configuration of the helicopter interior preferably accommodates two patients on stretchers (or litters) with a minimum of one medical attendant and one pilot.

It is the intent of the present invention to provide a medical equipment mounting system that readily accommodates the transportation of equipment for the benefit of the recipient patient. While the preferred embodiment of the present invention is being described with respect to an air-medical interior, specifically an air-medical helicopter, the present invention is equally adaptable to ground ambulances, fixed wing aircraft and/or other environments where it is important to have equipment (not necessarily medical equipment) located within close proximity of the operator. The system of the present invention allows the equipment to be readily moved from one location to another with respect to a substantially planar surface without unnecessarily detaching the equipment and equipment mounting hardware. It will be readily apparent to those skilled in the art how to adapt the advantages of the present invention to a variety of environments (including non-movable environments, i.e., emergency rooms, etc.). These various alternative embodiments are intended to fall within the purview of the present invention.

Figure 1:
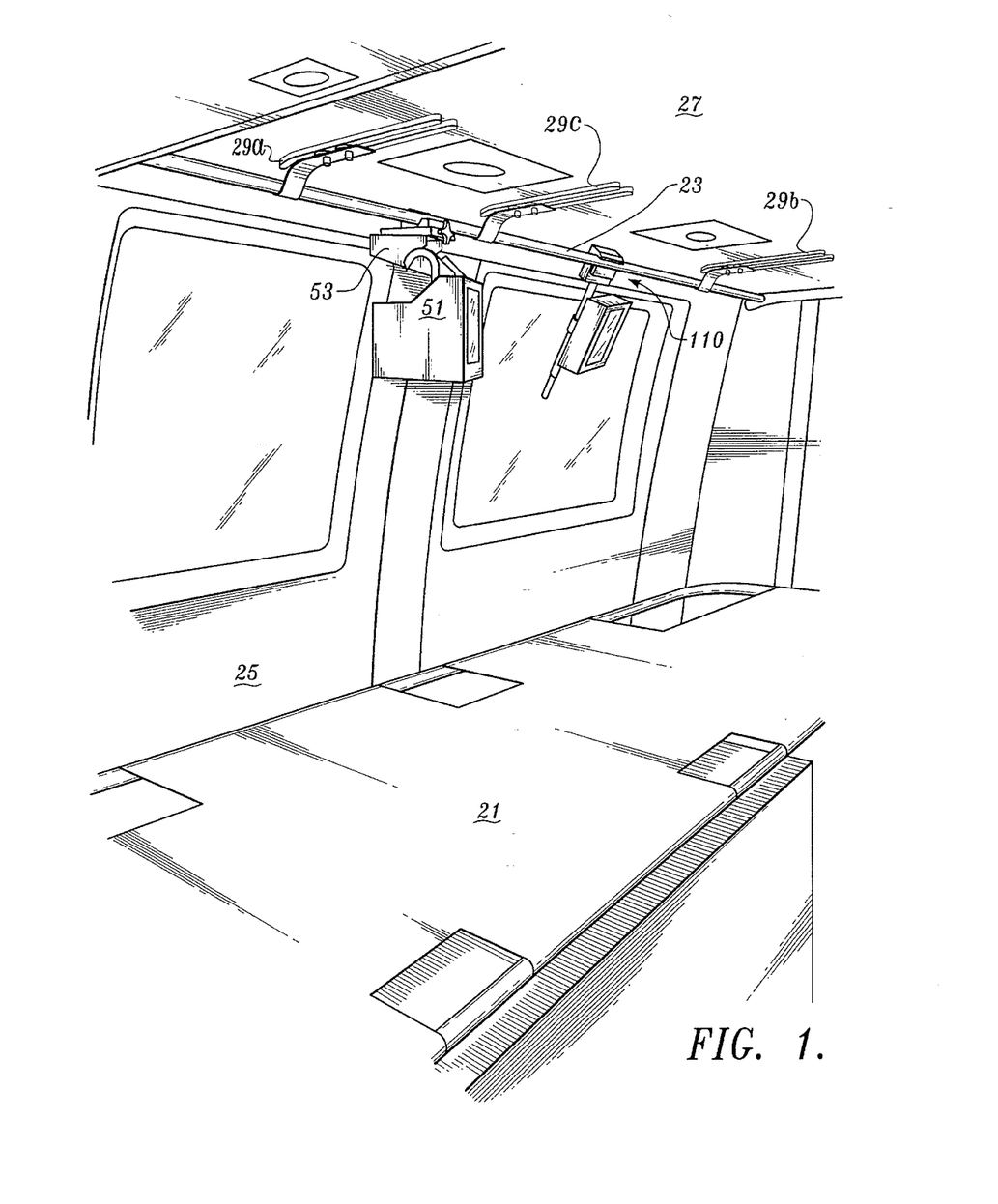
FIG. 1 is a perspective view of an air-medical interior having medical equipment positioned therein illustrating the preferred method of practicing the present invention.

Referring now to FIGURE 1 there is shown a general layout of an air-medical helicopter incorporating the medical equipment mounting system of the present invention. More specifically, there is shown a stretcher (or litter) 21 positioned within the helicopter interior. Preferably the stretcher is secured within the helicopter using a suitable fastening means (not shown). A patient (not shown) would presumably be positioned on the stretcher, generally along the longitudinal axis of the helicopter interior-although the patient may be positioned laterally depending on the particular helicopter. The present invention, in the preferred embodiment, positions an elongated suspension bar 23 longitudinally along an interior wall or ceiling (substantially planar surface) of the helicopter—although the suspension bar 23 may be positioned laterally. The elongated suspension bar 23 may be adjustably or permanently positioned on either side of the helicopter interior, or the elongated suspension bar 23 may be interchangeably configured for quick relocation—depending on the particular emergency for which the aircraft is being used and on pilot/attendant preference—from one side of the helicopter interior to the other side. In addition, the elongated suspension bar 23 may be configured for quick relocation from a forward lateral position, to a rearward lateral position, or to a longitudinal position.

Figure 5A:
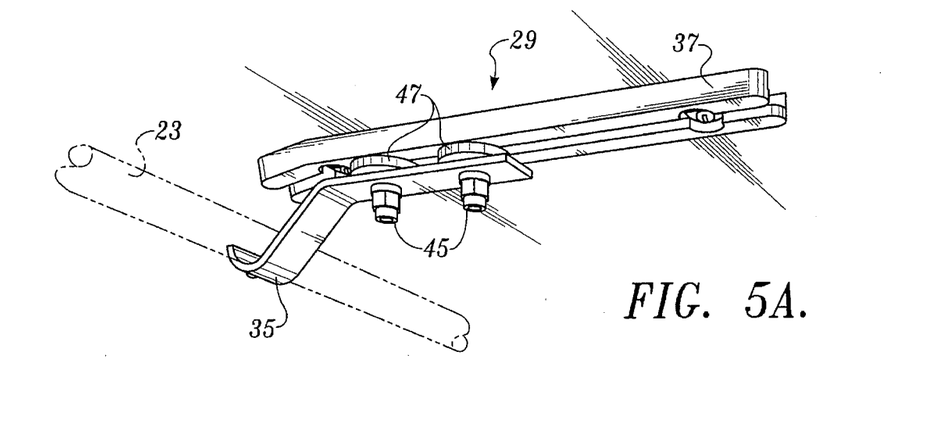
FIG. 5A is a perspective view of the medical equipment mounting hardware for securing the elongated suspension bar within the air-medical interior.
Figure 5B:
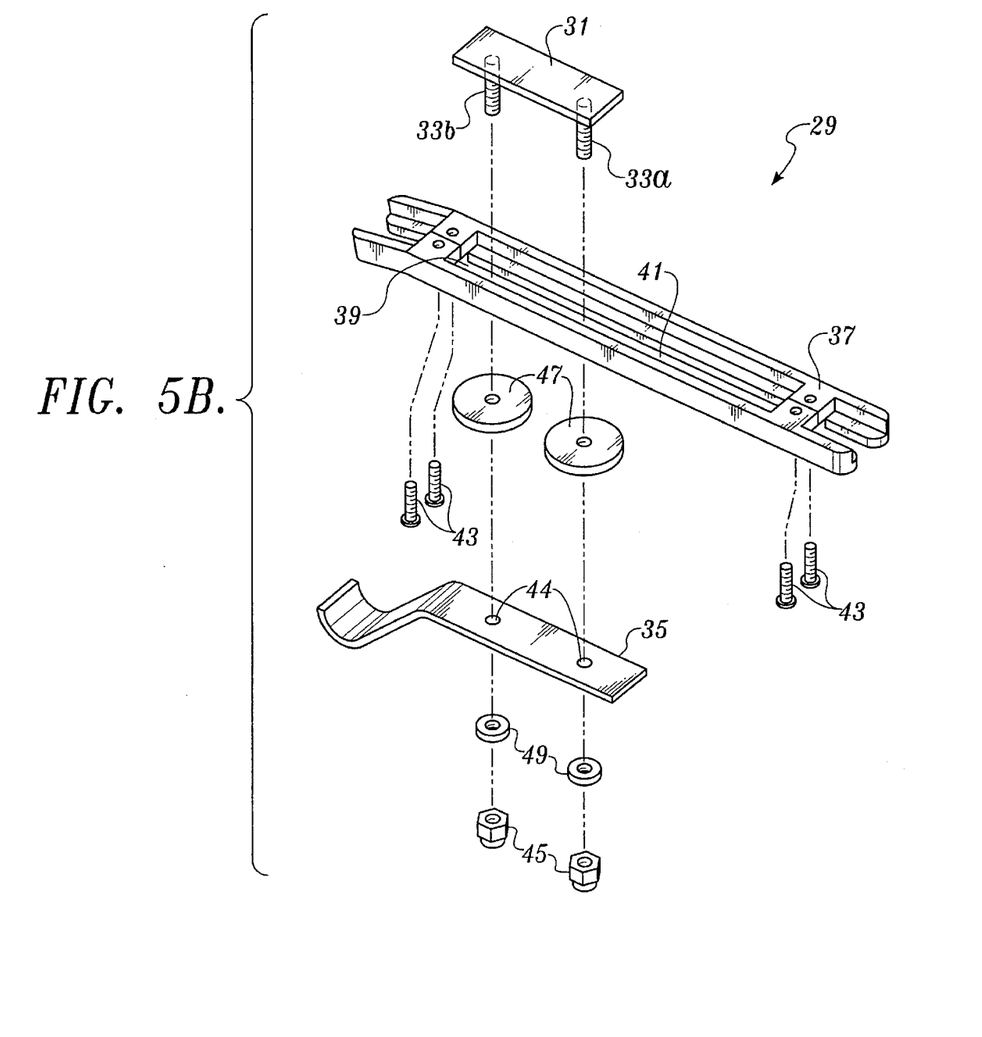
FIG. 5B is an exploded perspective view of the medical equipment mounting hardware shown in FIG. 5A.

The elongated suspension bar 23 shown in FIG. 1 is positioned along the right side of the helicopter interior, preferably at the intersection between an interior vertical surface 25 and an interior ceiling surface 27. The elongated suspension bar 23, as shown in FIGS. 5A and 5B, is movably mounted to the planar surface of the helicopter interior. In this regard, there are provided at least two mounting track assemblies 29a and 29b positioned at either end of the elongated suspension bar 23 (see FIG. 1). Depending on the length of the elongated suspension bar 23 and on the size and weight of the medical equipment to be attached to the elongated suspension bar 23, additional mounting track assemblies 29c may be added along the longitudinal length of the elongated suspension bar 23 between the end mounting track assemblies 29a and 29b.

As shown in FIG. 5B, each mounting track assembly 29a, 29b and 29c includes a slider plate 31. In the preferred embodiment, the slider plate 31 includes two male threaded studs 33a and 33b. The slider plate 31 is adapted to fit within a channel 39 in a slider track 37. The channel 39 has an oblong aperture 41 through which the male threaded studs 33a and 33b are inserted. In this regard, the slider plate 31 is slidably encased within the channel 39 when the slider track 37 is securely attached to a planar surface 27 with fasteners 43. Once the slider plate 31 is positioned within the channel 39, the male threaded studs 33a and 33b protrude through the slider track 37. A pinch bracket 35, having apertures 44 therethrough, can then be positioned such that the male threaded studs 33a and 33b are inserted through the apertures 44. Nuts 45 can then be threaded onto the male studs 33a and 33b, thereby securing the pinch bracket 35 to the slider track 37, and hence to the planar surface 27 of the helicopter interior. As part of the assembly and as shown in FIG. 5B, spacer washers 47 and lock washers 49 are also provided. The spacer washers 47 facilitate the sliding movement of pinch bracket 35 along the slider track 37. The lock washers 49 aid to securely locking the pinch bracket 35 in place with respect to the slider track 37 when the nuts 45 are tightened onto the male studs 33a and 33b of the slider plate 31.

It will be readily apparent to those skilled in the art that any number of studs 33a and 33b may be used to secure the pinch bracket 35 to slider track 37. In addition, other methods of slidably and/or removably securing the elongated suspension bar 23 to the planar surface 27 may be readily apparent to those skilled in the art. More specifically, different emergency vehicles may require different means for mounting medical equipment within the interior of the emergency vehicle. In this regard, the present invention surface provides an elongated suspension bar that is adjustably attached to a planar surface within the emergency vehicle.

Figure 2A:
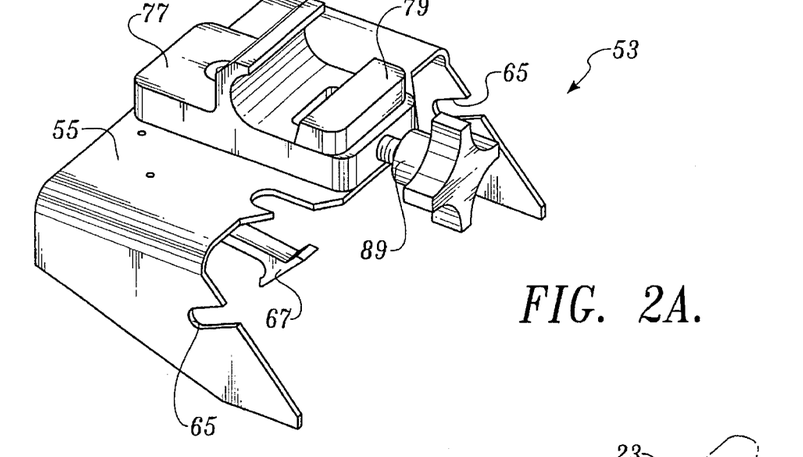
FIG. 2A is a perspective view of a medical equipment mounting accessory, in one aspect of the present invention, for slidably and removably securing a monitor to the air-medical interior.
Figure 2B:
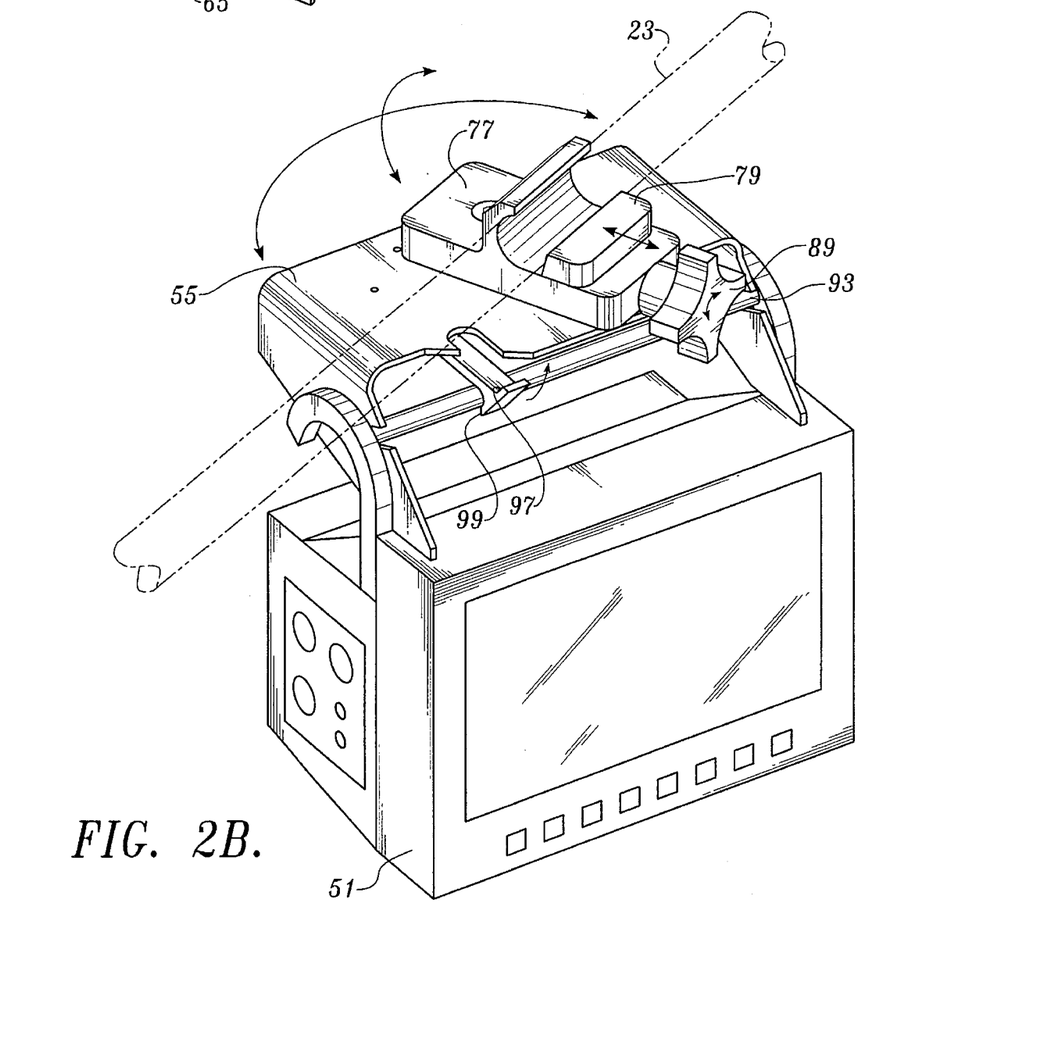
FIG. 2B is a perspective view of the medical equipment mounting accessory shown in FIG. 2A having a monitor attached thereto, the mounting accessory secured to an elongated suspension bar.
Figure 2C:
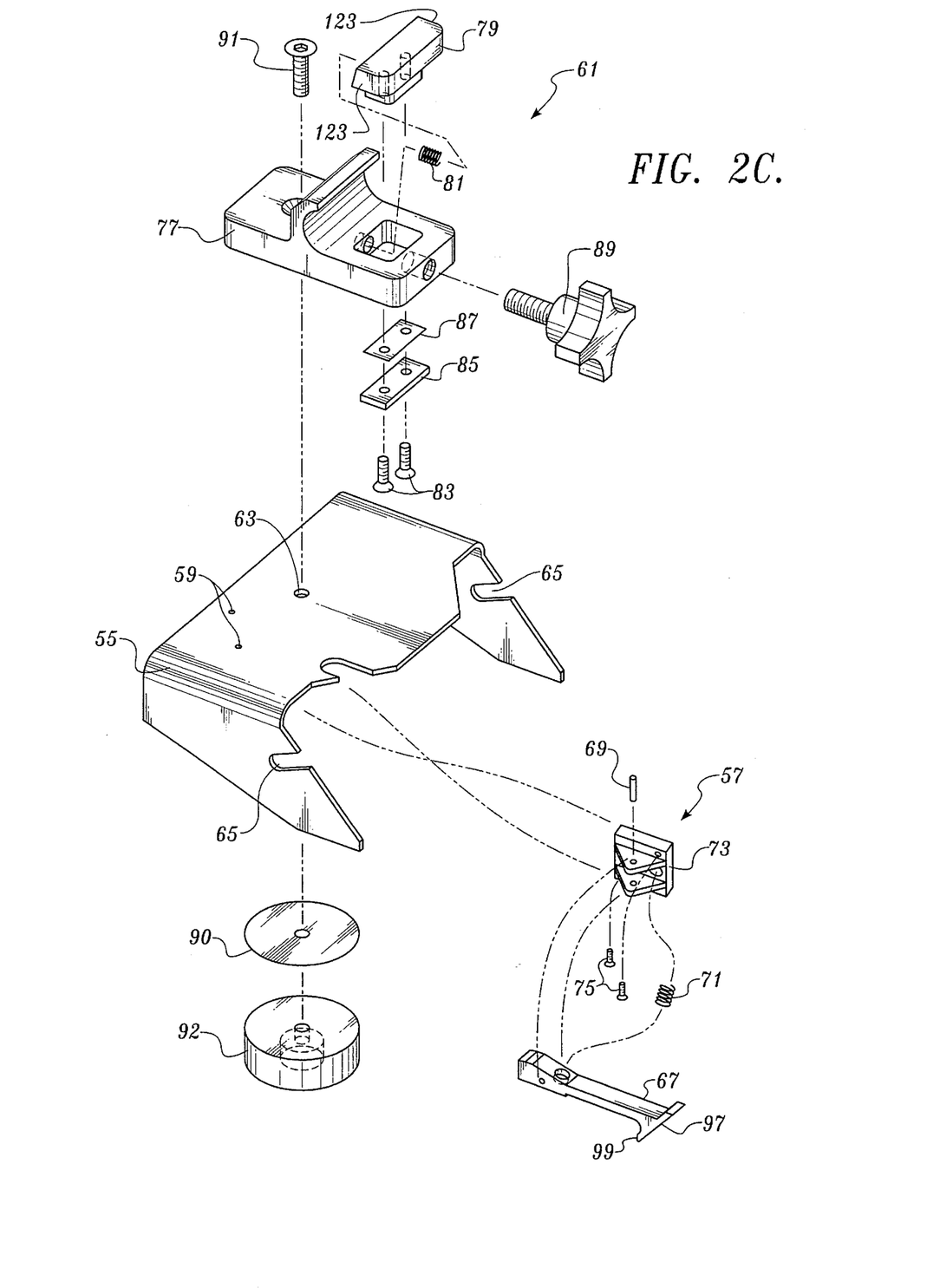
FIG. 2C is an exploded perspective view of the medical equipment mounting accessory shown in FIGS. 2A and 2B.

Referring now to FIGS. 2A, 2B and 2C, there is shown an exemplary one of the medical equipment accessories for securing medical equipment within the interior of an emergency response vehicle. Specifically, the accessory shown is a monitor mounting accessory 53 for securing a monitor 51 within the helicopter interior, specifically to the elongated suspension bar 23. As shown in the exploded view of FIG. 2C, the monitor mounting accessory 53 includes a base mounting plate 55, a monitor lock 57 and a suspension bar lock assembly 61. The base mounting plate 55 includes monitor lock mounting apertures 59, a suspension bar lock assembly mounting aperture 63 and monitor mount notches 65. The monitor lock 57 includes a lock bar 67, a lock bar hinge pin 69, a biasing spring 71, a mounting plate 73 and fasteners 75. The suspension bar lock assembly 61 includes a base block 77, a sliding pinch block 79 having arms 123, a pinch block guide plate 85 and a pinch block guide plate shim 87, pinch block fasteners 83, a biasing spring 81, a tensioner 89, a suspension bar lock assembly fastener 91, a thrust washer 90, and a suspension bar lock assembly fastening knob 92.

In operation, the monitor 51, which includes a monitor mounting bar 93, is inserted into the monitor mounting notches 65. As the monitor mounting bar 93 is inserted into the notches 65, the monitor mounting bar contacts a ramp 97 that is part of the forward portion of the lock bar 67. Continuing to insert the monitor bar 93 into the notches 65 biases the lock bar 67 upward against the biasing spring 71 until the monitor mounting bar 93 passes beyond the lower end 99 of the ramp 97 of the lock bar 67. The biasing spring 71 then causes the lock bar 67 to move downward to its original position, thus the monitor mounting bar 93 is captured within the monitor mounting notches 65, leaving the monitor 51 to rotate about the axis of the monitor mounting bar 93. To disengage the monitor 51 from the monitor mounting accessory 53, the lock bar 67 is moved upward, against the downward force of the biasing spring 71, sufficiently to permit the monitor mounting bar 93 to pass along the notches 65 out beyond the lower end 49 of the lock bar 67.

With respect to the operation of the suspension bar lock assembly 61 of the monitor mount, the suspension bar lock assembly will be described below with respect to the clamp accessory 116 of the medical equipment mounting accessory 110; the suspension bar lock assembly 61 of the monitor mount is substantially similar to the clamp accessory of the medical equipment mount accessory 110.

Figures 3A, 3B:
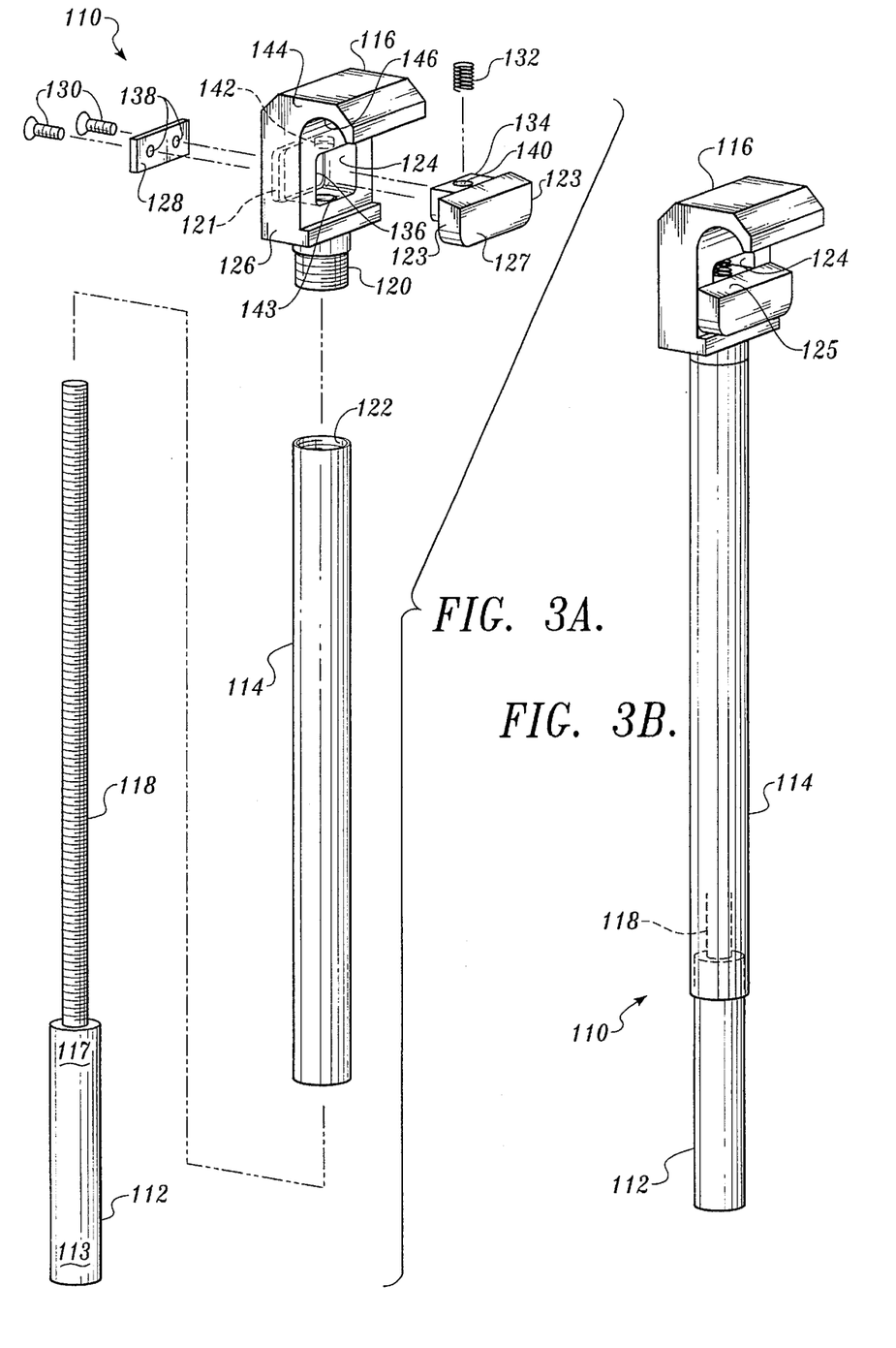
FIG. 3A is an exploded view of an alternative medical equipment mounting accessory, in a second aspect of the present invention, for slidably and removably securing a defibrillator to then air-medical interior.
FIG. 3B is an assembled perspective view of the medical equipment mounting accessory shown in FIG. 3A.

FIG. 3A is an exploded view of another medical equipment mounting accessory 110 of the present invention for slidably and removably securing a defibrillator (and other equipment) to the helicopter interior. FIG. 3B is a perspective view of the medical equipment mounting accessory 110 shown in FIG. 3A. The medical equipment mounting accessory 110 shown in FIGS. 3A and 3B includes a handle member or lower bar 112 having an upper portion 117, an equipment fastener lower portion 113 or upper bar 114, a clamp accessory 116 and a threaded adjustment bar 118.

The medical equipment mounting accessory 110 is assembled by screwing the clamp accessory 116 into the upper end of the upper bar 114 by means of mating threads 120 and 122 on the clamp 116 and the upper bar 114, respectively. The threaded bar 118 is screwed into matching threads in the upper portion 117 of the lower bar 112 and extends upwardly from the upper portion 117 of the lower bar 112. The lower bar 112 and the upper bar 114 are preferably both hollow members, however, the lower bar 112 may be a solid member if that is more convenient for manufacturing and/or the intended use of the medical equipment mounting accessory 110; a solid bar may, however, increase the overall weight of the medical accessory 110.

The outside diameter of the lower bar 112 is preferably less than the inside diameter of the upper bar 114, so that the lower bar 112 can be caused to telescopically move into and out of the upper bar 114 as the threaded bar 118 is threaded into and out of the clamp accessory 116. The overall length of the threaded bar 118 is preferably greater than the overall length of the upper bar 114, so that the threaded bar 118 can be screwed into the upper portion 117 of the lower bar 112 and still extend into the matching threads (not shown) in the lower end of the clamp accessory 116.

When screwed into the threads in the lower end of the clamp accessory 116, the threaded bar 118 engages a bottom surface (not shown) of a pinch block 127 movably contained within the clamp accessory 116. This arrangement allows the overall length of the assembled medical equipment mounting accessory 110 to be adjusted by twisting the lower bar 112 relative to the clamp accessory 116, thereby causing the upper portion 117 of the lower bar 112 to move relative to the clamp accessory 116, inside the upper bar 114; this configuration will be described in greater detail below. The defibrillator equipment can then be attached to any portion of the upper bar 114 by means of conventional attachment mechanisms (not shown).

The clamp accessory 116 includes a block 126 that, as mentioned above, has threads 120 on a lower portion of the block 126 for matingly engaging with thread 122 in the upper bar 114. The clamp accessory 116 further includes a pinch block 127, a backing plate 128 having apertures therethrough, fasteners 130 and a biasing spring 132. The pinch block 127 has a mating portion 134 for extending into a cavity 124, toward an enlarged aperture 136 in the back of the block 126. The backing plate 128 slidably fits within a channel 121 formed in the back of the block 126. Accordingly, as the pinch block 127 moves within the cavity 124, the backing plate 128 moves within the channel 121. The backing plate 128 includes two apertures 138 through which the fasteners 130 pass to movably secure the pinch block 127 to and within the block 126. The fasteners 130 preferably screw into mating threaded holes (not shown) on the mating portion 134 of the pinch block 127, thereby holding the pinch block 127 movably in place within the cavity 124. More specifically, the mating portion 134 is sandwiched between the backing plate 128 and two extending arms 123 of the pinch block 127.

The biasing spring 132 extends between a cavity 140 in the pinch block 127 and a cavity 142 formed in the upper portion of the cavity 124 in the block 126. The biasing spring 132 biases the pinch block 127 downward toward the upper bar 114 and the lower bar 112. An upper portion 144 of the block 126 has an inner curved surface 146 with an internal radius substantially the same but slightly greater than the radius of the elongated suspension bar 23 (see FIG. 1), to which the mounting accessory 110 can be attached.

In operation, the lower bar 112 is rotated preferably by hand to back the threads of the threaded bar 118 out of the cavity 124. In this regard, the pinch block 127, being biased downward by the biasing spring 132, moves downward until the suspension bar 23 can be fitted between the inner curved surface 146 of the upper portion 144 and a bevel 125 of the pinch block 127. To an extreme, the pinch block 127 may be moved downward until the lower surface (not shown) of the mating portion 134 contacts a lower surface 143 of the cavity 124.

Figure 6:
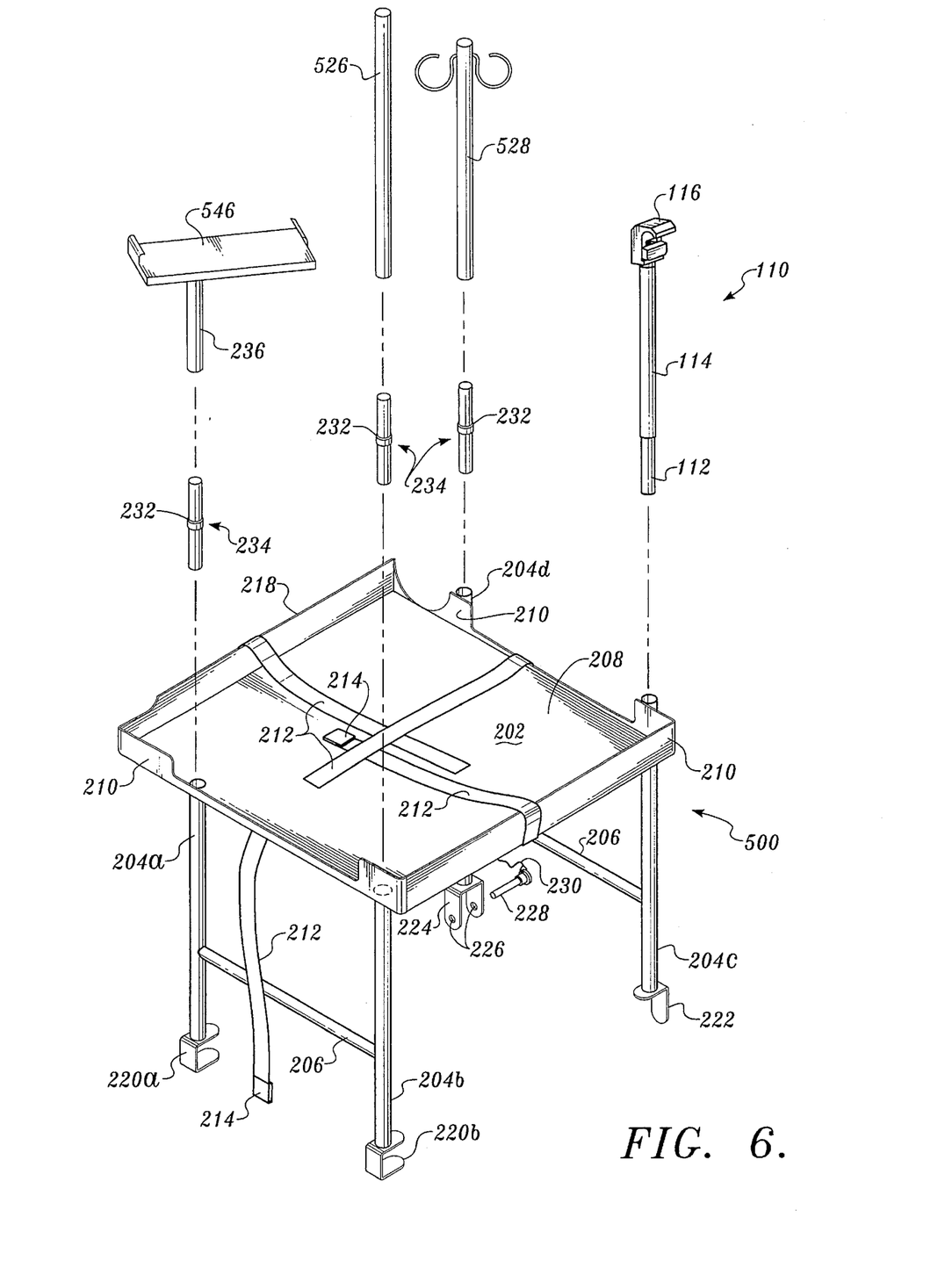
FIG. 6 is an exploded perspective view of a stretcher bridge and the medical equipment mounting accessories of the present invention illustrating how the medical equipment mounting accessories are configured for being secured to the stretcher bridge, the stretcher bridge being adapted to a stretcher.

In a preferred embodiment of the present invention, the lower bar 112 has an outside diameter substantially equal to the inside diameter of the upper bar 114. In this regard, as will be described in greater detail below, a lower portion 113 of the lower bar 112 can be slid inside a bar, preferably a bar used to construct a stretcher bridge 500 having the same outside and inside dimensions as the upper bar 114.

Figure 4:
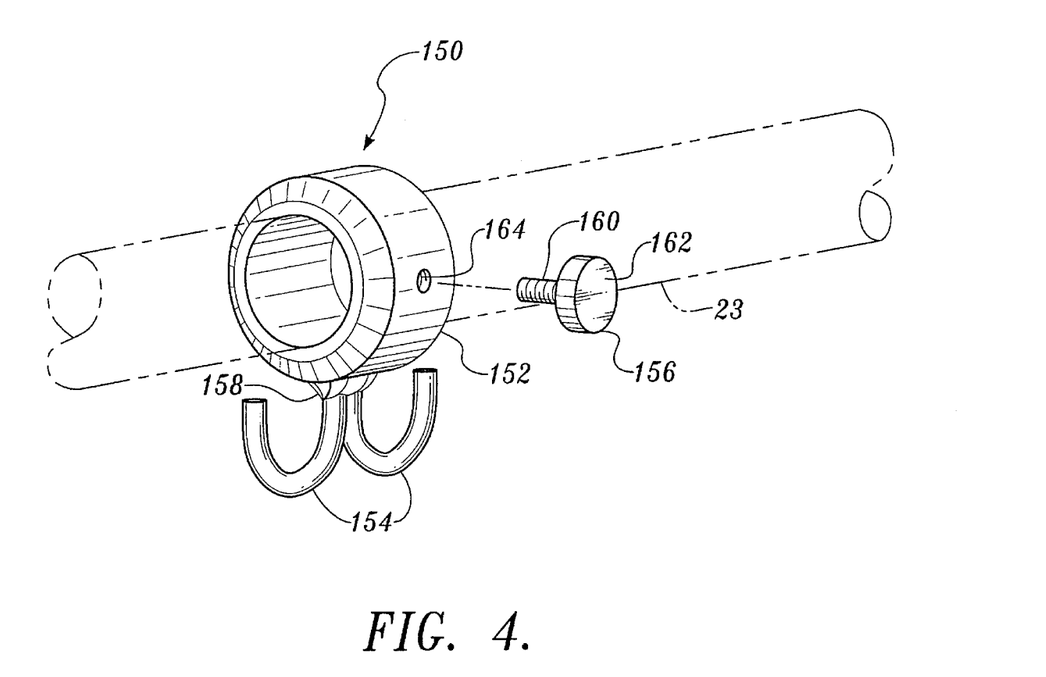
FIG. 4 is an exploded perspective view of yet another medical equipment mounting accessory, in a third aspect of the present invention, for movably securing intravenous bags and pumps within the air-medical interior.

Referring now to FIG. 4, there is shown is an exploded perspective view of yet another medical equipment mounting accessory for movably securing medical equipment, specifically intravenous bags and pumps, within the helicopter interior. The medical equipment mounting accessory 150 includes a collar 152, one or more hooks 154, and a setscrew 156 having a bolt 160 and a knob 162. The collar 152 is generally cylindrical in shape, having an inside shape and dimension substantially similar (the inside dimension being slightly greater) to the outside shape and dimension of the elongated suspension bar 23 with which the collar 152 can be engaged. In this regard, the collar 152 is longitudinally movable along the length of the elongated suspension bar 23.

The collar 152 also includes a boss 158, that may serve as a pivot for the one or more hooks 154. Alternatively, the hooks 154 may be permanently secured to the collar 152. In use, the setscrew 156, using the knob 162, is screwed into a mating threaded aperture 164 passing through the collar 152 until the end of the bolt 160 engages against the elongated suspension bar 23. In this regard, the setscrew 156 can be loosened to slide the mounting accessory 150 along the longitudinal length of the elongated suspension bar 23 and tightened accordingly to securely hold the medical equipment monitor accessory 150 in place.

Figure 7:
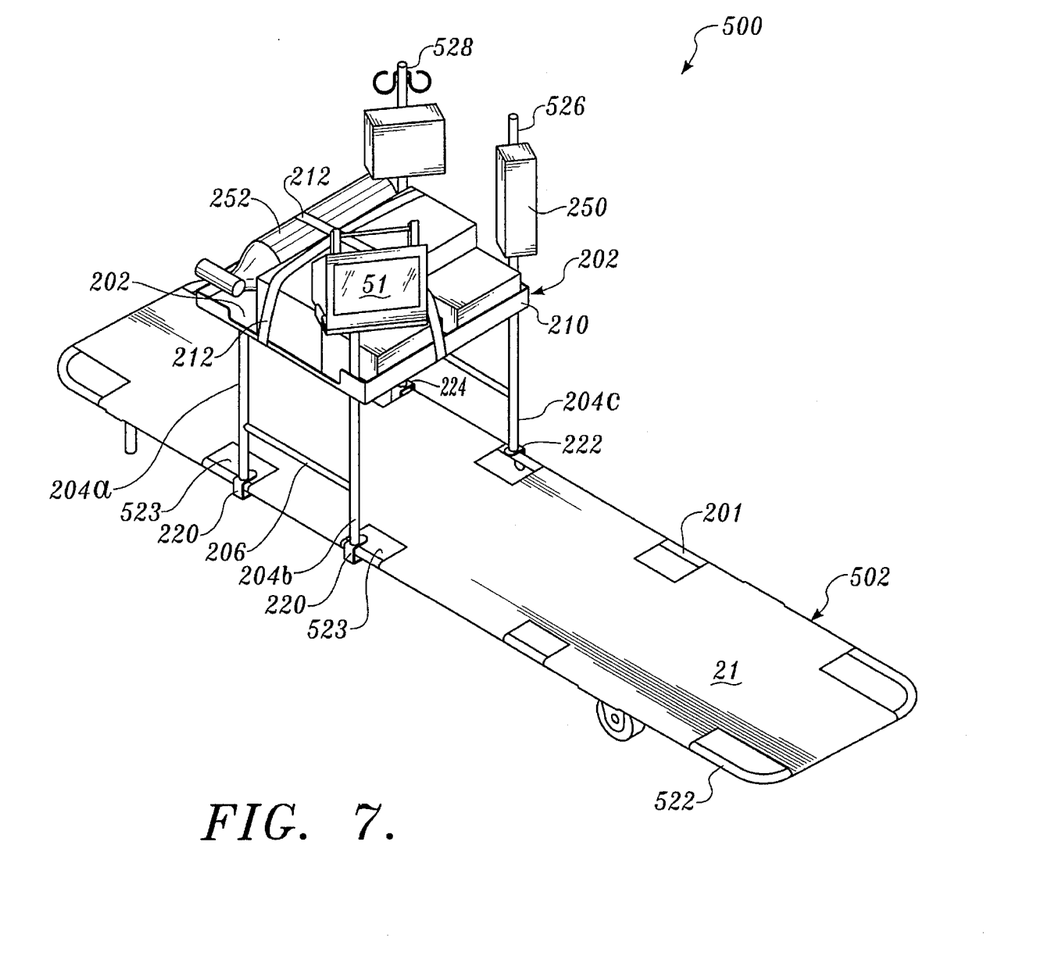
FIG. 7 is a perspective view of the medical equipment mounting accessories of the present inventions secured to the stretcher bridge, the stretcher bridge being secured to the stretcher.

Referring now to FIG. 6 and 7, there is shown a novel stretcher bridge 500 configured to work in cooperation with the medical equipment mounting system of the present invention. During transfer and transport of a patient, the patient generally needs portable medical equipment or supplies in close proximity to and, sometimes, connected to the patient. The stretcher bridge 500 shown in FIG. 6 facilitates carrying medical equipment along with the patient as the patient is moved into and out of emergency response vehicles and transferred into and out of a respective medical facilities.

As shown in FIG. 6, the stretcher bridge assembly 500 is coupled to the stretcher 21 such that the stretcher bridge assembly 500 is above and over the foot end of the patient; preferably the stretcher bridge assembly 500 is configured to hold the desired portable medical equipment needed for an emergency. The stretcher bridge assembly 500 includes a substantially planar tray 202 having legs 204a, 204b, 204c and 204d extending downwardly therefrom. Foot couplings 220a, 220b, 222 and 224 are affixed to the bottom ends of legs 204a, 204b, 204c and 204d, respectively, to couple the tray to the stretcher frame. Stretcher bridge assembly 500 further includes extension posts 236, 526 and 528, which can be coupled to the upper ends of selected legs so as to project above the tray 202. In the preferred embodiment, the extension posts 236, 526 and 528 are coupled to the upper ends of legs 204a, 204b, 204c and 204d by a coupler 234 having an abutment frame 23 ring 232. Three extension posts 236, 526 and 528 are preferably provided wherein medical equipment may be clamped in place on the bar of the right forward extension post 526; medical equipment may be hung from the hooks of the left aft extension post 528; medical equipment may be placed on a plate 546 secured to the upper end of the right aft extension post 236; or medical equipment may be secured as described above using medical mounting accessory 110. The extension posts 236, 526 and 528 preferably have an inside dimension substantially similar to the inside dimension of the legs 204a, 204b, 204c and 204d (and to the inside dimension of the upper bar 114 of the medical equipment mount accessory 110). According the couplers can be readily fit within some of the legs or all of the legs 204a, 204b, 204c and 204d, to secure thereto extension posts 236, 526 and 528. In the preferred embodiment, each of the legs 204a, 204b, 204c and 204d has a teflon lining in its upper end portion. In this regard, the couplers 232 are dimensioned to readily slide within the teflon liner. The teflon liner insures that the extension posts 236, 526 and 528 will not become jammed or otherwise difficult to insert and/or extract from the upper portion of the legs 204a, 204b, 204c and 204d. Similarly, the lower bar 112 may be dimensioned to fit within the teflon lining. It would be readily apparent to those skilled in the art that various methods and means may be used to adapt the extension posts 236, 526 and 528 to the upper portions of the legs 204a, 204b, 204c and 204d and the medical equipment mount accessory 110, these means are intended to fall within the purview of the present invention.

Tray 202 has a generally rectangular shape with a flat bottom portion, the bottom portion 203 being in a co-planar relationship with the stretcher frame 201 and 522. Tray sides 210 preferably extend upward from the flat bottom portion 203 of the tray 202 to confine medical equipment supported on the tray 202. Tray sides 210, which, in the preferred embodiment are perpendicular to extend 90° from flat portion 208 of the tray 202, are contoured so as to conform to the placement of the medical equipment on the tray 202, such as oxygen tanks, defibrillators and/or other bags and equipment. Tie-down straps 212 have end portions (not shown) secured beneath tray 202. The tie-down straps 212 can be used to secure the medical equipment to the tray 202. The ends of the straps 212 are preferably secured together using fasteners 214.

The stretcher bridge assembly 500 is coupled to the stretcher frame 502 by first fitting the right forward foot coupling 220a and the right aft foot coupling 220b over the right side of the stretcher frame 522. The foot couplings 220a and 220b have C-shaped sections with openings facing inward. Once slipped over the right side of the stretcher frame 522 in stretcher canvas openings 523 (FIG. 7), the couplings 220a and 220b restrain movement of stretcher bridge assembly 500 in all directions except laterally outward and longitudinally along the stretcher frame 522.

Once the right foot couplings 220a and 220b are in place, the left side of the stretcher bridge assembly 500 is lowered into place. Accordingly the left foot couplings, which include a left forward foot coupling 222 and a left aft foot coupling 224 attached to the left forward leg 204c and the left aft leg 204d, respectively, come to rest on left stretcher frame 201. The left forward foot coupling 222 is in the form of an inverted L-shape which accommodates placing the left forward leg 204c on the left stretcher frame 201. Once the left forward foot coupling 222 is lowered into place onto the left side of the litter frame 201, it restrains movement in an inward lateral direction and in a downward direction. The left aft foot coupling 224 is in the shape of an inverted U. Once the left aft foot coupling 224 is slipped over the left side of the litter frame 201, a retainer pin 536 is placed through apertures in the arms of the inverted U so as to trap the stretcher frame 201 within the U. With the retainer pin 536 inserted, the stretcher bridge assembly 500 is substantially secured to the stretcher 21.

Because of the unique combination of the C-shaped foot couplings 220a and 220b on the right side of the stretcher frame 522 and the U-shaped left aft foot coupling 224 with retainer pin 536 on the left side of the stretcher frame 201, the stretcher bridge assembly 500 is substantially secured to the stretcher 21, however, the stretcher bridge 500 may be slide slightly forward or rearward depending on attendant preference within the stretcher canvas opening 523. This unique combination of foot couplings provides for quickly and easily attaching or detaching the stretcher bridge assembly 500 to and from the stretcher 21 with a minimal effort and only one retainer pin 536.

The overall utility of the hardware described above facilities the transfer of equipment between the stretcher bridge assembly 500 and the interior of the emergency vehicle. When moving an individual from an accident location to an emergency vehicle, any life sustaining equipment judged necessary to support that individual may be attached to the stretcher bridge assembly 500 and carried to the patient's side. The patient may then be placed on the stretcher 21 and carried to the emergency vehicle. When the stretcher (with the stretcher bridge assembly 500 in place) has been moved into and secured within the emergency vehicle interior, the equipment on the stretcher bridge assembly 500 may be relocated to the elongated suspension bar 23. After the equipment has been removed from the stretcher bridge assembly 500, the stretcher bridge assembly 500 itself may be removed from the stretcher 21 if the attendants deem this procedure necessary to properly treat the patient.

After the emergency vehicle has arrived at its destination, the medical equipment that has been attached to the elongated suspension bar 23 may be moved back to the stretcher bridge assembly 500 (after the stretcher bridge assembly 500 has been attached to the stretcher 21) and the stretcher 21 with the stretcher bridge assembly 500 and necessary medical equipment in place, carried into an emergency room with the patient.

While the foregoing has been described in detail with respect to the preferred embodiments of the present invention, it will be appreciated by those skilled in the art that various modifications may be made without departing from the spirit and scope of the invention.

I claim:

1. An apparatus for positioning and securing equipment relative to a substantially planar surface of an interior of a vehicle, comprising:

(a) a suspension bar secured to the substantially planar surface of the interior of the vehicle, the suspension bar being laterally and longitudinally adjustable with respect to the planar surface; and (b) an equipment fastener for securing the equipment to the suspension bar, the equipment fastener having an upper end and an equipment fastener end, the upper end being slidably and removably attached to the suspension bar, the equipment fastener end of the equipment fastener being adapted for securing equipment thereto.

2. The apparatus of claim 1, wherein the upper end of the equipment fastener comprises:

(a) a base block having a substantially curved inner surface for being slidably and removably attached to the suspension bar; and (b) a slider pinch block movably secured to the base block, the slider pinch block being movable toward and away from the substantially curved inner surface of the base block, wherein as the slider pinch block is adjusted with respect to the base block, the slider pinch block releases the equipment fastener to and from the suspension bar.

3. The apparatus of claim 2, wherein the equipment fastener end of the equipment fastener includes a substantially elongated body having a lower end, an upper end, and an inside dimension, the lower end having an adjustment means secured thereto, the adjustment means linked to the slider pinch block wherein rotation of the adjustment means moves the slider pinch block toward and away from the substantially curved inner surface of the base block.

4. The apparatus of claim 3, wherein equipment for use by respective operator is secured to the elongated body of the equipment fastener by a fastening means.

5. The apparatus of claim 4, wherein the adjustment means has an outside dimension less than the inside dimension of the elongated body, the adjustment means being partially inserted into the lower end of the elongated body, the adjustment means telescopic moving into and out of the lower end of the elongated body as the slider pinch block moves toward and away from the substantially curved inner surface of the base block.

6. The apparatus of claim 2, wherein the lower end of the equipment fastener includes a plate member for attaching thereto the equipment to be used by an operator, the plate member being rotatably secured to the base block for rotating and repositioning the equipment with respect to the planar surface after the equipment fastener has been secured to the suspension bar.

7. An apparatus for positioning and securing equipment relative to a substantially planar surface of an interior of a vehicle, comprising:

(a) a suspension bar secured to the substantially planar surface of the interior of the vehicle, the suspension bar being laterally and longitudinally adjustable with respect to the planar surface; and (b) an equipment fastener for securing the equipment to the suspension bar, the equipment fastener having an inside dimension slightly larger than an outside dimension of the suspension bar wherein the equipment fastener is slidable along the longitudinal length of the suspension bar.

8. The apparatus of claim 1, wherein the equipment fastener further comprises:

(a) a securing lock wherein the equipment fastener can be stood longitudinal along the length of the suspension bar and when properly positioned securing lock can be tightened to secure the equipment fastener with respect to the suspension bar.

9. The apparatus of claim 8, wherein the equipment fastener has secured thereto a hook means for hanging therefrom equipment for use by an operator, the equipment being positioned longitudinally along the suspension bar.

10. The apparatus of claim 9, wherein the equipment fastener includes a plurality of hooks for attaching thereto the equipment to be used by the operator, relative to the suspension bar.

11. A method for securing medical equipment to a substantially planar surface within the interior of a vehicle, comprising the steps of:

(a) adjustably securing a suspension bar to the substantially planar surface, the suspension bar being adjustable laterally and longitudinally with respect to the planar surface;

(b) adjustably attaching to the suspension bar an equipment fastener having an upper end and an equipment fastener end, the upper end being slidably attached to the suspension bar, the equipment fastener end being adapted for securing equipment thereto;

(c) securing equipment to the equipment fastener end; and (d) positioning the equipment fastener longitudinally along the suspension bar for appropriate access by an attendant.

12. The method of claim 11, further comprising the steps of:
   (a) slidably clamping the upper end of the equipment fastener to the suspension bar; and
   (b) clamping the upper end of the equipment fastener to the suspension bar, thereby securing the equipment in the suspension bar.

13. The method of claim 12, further comprising the steps of:
   (a) unclamping the upper end of the equipment fastener from the suspension bar;
   (b) removing the equipment fastener from the suspension bar; and
   (c) placing the lower end of the equipment fastener end into a holding rack for caring the equipment to and from the vehicle.

14. An apparatus for positioning and securing medical equipment relative to a suspension bar secured to a substantially planar surface of an interior of an emergency vehicle, the suspension bar being laterally and longitudinally adjustable with respect to the planar surface, comprising:
   (a) an upper end being slidably and removably attached to the suspension bar;
   (b) an elongated body having a first end and second end, the first end being secured to the upper end of the apparatus; and
   (c) an adjustment means secured to the second end of a elongated body, the adjustment means linked to the upper end through the interior of the elongated body.

15. The apparatus of claim 14, wherein the upper end of the apparatus comprises:
   (a) a base block having a substantially inner curved inner surface for being slidably and removably attached to the suspension bar; and
   (b) a slide pinch block removably secured to the base block, the slider pinch block being movable toward and away from the substantially curved inner surface of the base block, wherein as the slider block is adjusted with respect to the base block, the slider pinch block secures and releases the apparatus to and from the suspension bar.

16. The apparatus of claim 14, wherein the adjustment means has an outside dimension less than an inside dimension of the elongated body, the adjustment means being partially inserted into the second end of the elongated body, the adjustment means telescopically moving into and out of the second end of the elongated body as the slider pinch block moves toward and away from the substantially curved inner surface of the base block.

17. An apparatus for positioning and securing equipment relative to a substantially planar surface of an interior of a vehicle, comprising:
   (a) a suspension bar secured to the substantially planar surface of the interior of the vehicle, the suspension bar being laterally and longitudinally adjustable with respect to the planar surface; and
   (b) an equipment fastener for securing the equipment to the suspension bar, the equipment fastener having an upper end and an equipment fastener end, the upper end being slidably and removably attached to the suspension bar and comprising:
      (i) a base block having a substantially curved inner surface for being slidably and removably attached to the suspension bar; and
      (ii) a slider pinch block movably secured to the base block, the slider pinch block being movable toward and away from the substantially curved inner surface of the base block, wherein as the slider pinch block is adjusted with respect to the base block, the slider pinch block releases the equipment fastener to and from the suspension bar;
   the equipment fastener end of the equipment fastener being adapted for securing equipment thereto and comprising a substantially elongated body having a lower end, an upper end, and an inside dimension, the lower end having an adjustment means secured thereto, the adjustment means linked to the slider pinch block wherein rotation of the adjustment means moves the slider pinch block toward and away from the substantially curved inner surface of the base block.

18. The apparatus of claim 17, wherein equipment for use by respective operator is secured to the elongated body of the equipment fastener by a fastening means.

19. The apparatus of claim 17, wherein the adjustment means has an outside dimension less than the inside dimension of the elongated body, the adjustment means being partially inserted into the lower end of the elongated body, the adjustment means telescopic moving into and out of the lower end of the elongated body as the slider pinch block moves toward and away from the substantially curved inner surface of the base block.

* * * * *